No. 771,845. PATENTED OCT. 11, 1904.
M. F. TEICHER.
WAGE COMPUTING DEVICE.
APPLICATION FILED APR. 9, 1903. RENEWED AUG. 10, 1904.
NO MODEL.
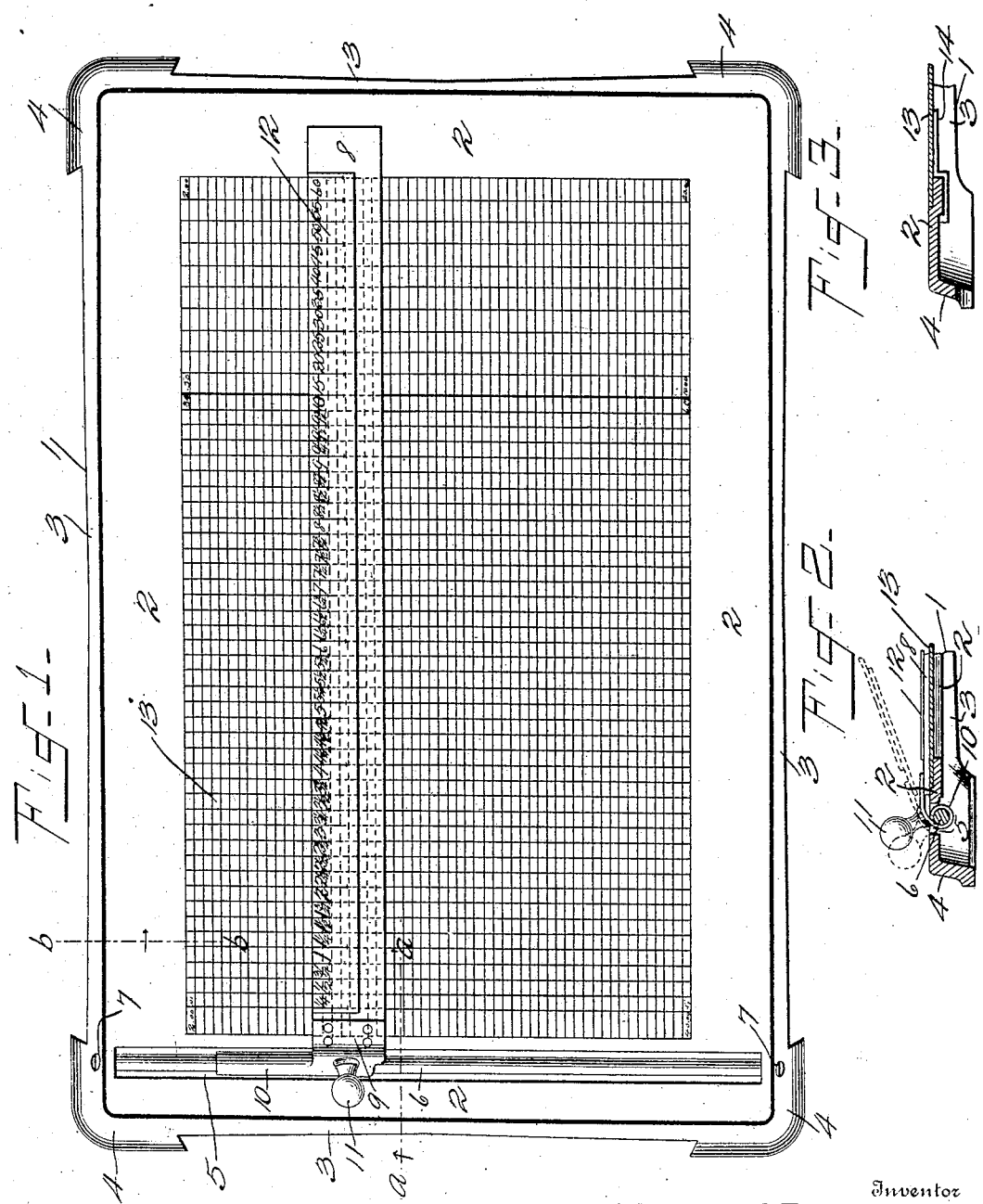
Witnesses
George Hilton.
Roy C. Heflebower.
Inventor
Max F. Teicher,
By H. B. Willson &co.
Attorneys No. 771,845.

Patented October 11, 1904.

UNITED STATES PATENT OFFICE.

MAX FERDINAND TEICHER, OF WEEHAWKEN, NEW JERSEY.

WAGE-COMPUTING DEVICE.

SPECIFICATION forming part of Letters Patent No. 771,845, dated October 11, 1904.

Application filed April 9, 1903. Renewed August 10, 1904. Serial No. 220,159. (No model.)

*To all whom it may concern:*

Be it known that I, MAX FERDINAND TEICHER, a citizen of the United States, residing at Weehawken, in the county of Hudson and State of New Jersey, have invented certain new and useful Improvements in Wage-Computing Devices; and I do declare the following to be a full, clear, and exact description of the invention, such as will enable others skilled in the art to which it appertains to make and use the same.

My invention is an improved wage-computing device; and it consists in the peculiar construction and combination of devices hereinafter described and claimed.

The object of my invention is to provide a simple, cheap, compact, easily-operated, and efficient device for computing the amount of wages due an employee for a given length of time at a given rate and avoid the necessity of making calculations to ascertain the same, thus greatly facilitating the paying off of employees.

In the accompanying drawings, Figure 1 is a top plan view of a wage-computing device embodying my improvement. Fig. 2 is a longitudinal sectional view of the same, taken on the plane indicated by the line *a a* of Fig. 1. Fig. 3 is a transverse sectional view of the same, taken on the plane indicated by the line *b b* of Fig. 1.

In the embodiment of my invention I provide a rectangular frame 1, which constitutes a base, is preferably a casting, is provided in its upper side with a rabbet 2, which extends around the four sides thereof, and is provided at its outer edges with depending side flanges 3, at the corners of which are formed supporting-feet 4. Extending transversely across the said frame, at the left-hand end thereof, is a slot 5. In the said slot and disposed at a suitable distance below the upper surface of the base-frame 1 is a guide-rod 6, the ends of which are supported in horizontal openings 7 in the side flanges of the said frame. A sliding bar 8 is provided at one end with a head 9, which has a tubular eye 10, which extends downwardly into and is disposed in the slot 5 and through which the guide-rod extends, the bar 8 being thereby pivotally connected to and slidable on the guide-rod and slidable transversely on the base-frame. By reason of the pivotal connection between the bar 8 and the guide-rod said bar 8 may be raised from the base-frame when desired, and to enable said bar to be readily shifted on the guide-rod and the base-frame I provide the same at its pivotal end with a finger-grip or knob 11. The said bar 8 is provided with a scale 12, which is detachable therefrom, the said scale indicating the working hours constituting a week and subdivisions of the hours in quarters and halves. Thus if ten hours constitute a day's work the said time-scale will run from one-fourth of an hour to sixty hours. A suitable time-scale will be employed, according to the number of hours constituting a day's work. I also provide a plate 13, which is of suitable size to fit in the rabbet in the sides of the frame. The said plate is adapted to be attached to the base-frame and to be readily detached therefrom, and to effect this I provide the said plate in the form of my invention here shown with a plurality of metallic straps 14, which are secured to the under side thereof and are adapted to be bent into engagement with the inner and under sides of the opening in the base-frame. Any other suitable means may within the scope of my invention be employed to thus detachably secure the said plate 13 in the opening of the base-frame, and I do not desire to limit myself in this particular.

It will be understood from the foregoing and observed by reference to the drawings that the rabbet in the upper side of the base-frame and which extends around the sides of the opening therein enables the plate 13 to be disposed with its upper side flush with that of the base-frame. On the upper side of the said plate 13 is a wage-scale arranged in vertical columns and in horizontal lines, the respective columns of the wage-scale indicating wages for the hours and subdivisions thereof constituting the working week and at different rates, the said vertical columns of the wage-scale corresponding with the graduations of the time-scale 12, so that by shifting the bar 8, which carries the time-scale, from the wage-scale and causing a graduation on the time-scale indicating a period of time to coincide with a horizontal line of figures indicating a rate of wages per week the amount due an employee for a period of time less than a week may be readily ascertained with absolute accuracy and without the necessity of making calculations.

It will be understood that the wage-scale must correspond with the time-scale, and to enable my improved wage-computer to be used for computing wages for a week or other period of time composed of working days or of any number of hours I adapt a wage-computer to be provided with appropriate wage and time tables or scales and enable the latter to be detached from the device, so that any appropiate scales and table may be used in connection therewith.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A wage-computing device, comprising a base-frame having a rabbet in its upper side, a plate having a wage-table adapted to fit in said rabbet, and having means to engage the under side of said base-frame and thereby detachably connect said plate to said base-frame, and a bar pivotally and slidably connected to said base-frame, said bar adapted to carry a time-scale to coact with the wage-table and move over the same, substantially as described.

In testimony whereof I have hereunto set my hand in presence of two subscribing witnesses.

MAX FERDINAND TEICHER.

Witnesses:
J. W. SCHELLHORN,
FRED. SCHELLHORN.